(12) United States Patent
Zhang et al.

(10) Patent No.: US 12,265,681 B2
(45) Date of Patent: Apr. 1, 2025

(54) DISPLAY DEVICE

(71) Applicants: K-Tronics (Suzhou) Technology Co., Ltd., Jiangsu (CN); BOE Technology Group Co., Ltd., Beijing (CN)

(72) Inventors: Jingjing Zhang, Beijing (CN); Wei Huang, Beijing (CN); Zhaoxi Yu, Beijing (CN); Guangning Hao, Beijing (CN); Shu Zhang, Beijing (CN); Ze Jin, Beijing (CN); Zhongcheng Li, Beijing (CN); Wenbo Dong, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/681,535

(22) PCT Filed: May 31, 2022

(86) PCT No.: PCT/CN2022/096428
§ 371 (c)(1),
(2) Date: Feb. 6, 2024

(87) PCT Pub. No.: WO2023/077789
PCT Pub. Date: May 11, 2023

(65) Prior Publication Data
US 2024/0370123 A1 Nov. 7, 2024

(30) Foreign Application Priority Data
Nov. 5, 2021 (CN) .......................... 202111304644.6

(51) Int. Cl.
*G06F 3/042* (2006.01)
*G02B 5/20* (2006.01)

(52) U.S. Cl.
CPC ........... *G06F 3/0428* (2013.01); *G02B 5/208* (2013.01)

(58) Field of Classification Search
CPC ...... H05K 1/147; H05K 3/361; H05K 1/0269; H05K 1/028; H05K 2201/055;
(Continued)

(56) References Cited

U.S. PATENT DOCUMENTS

2014/0104761 A1* 4/2014 Hsu ..................... H05K 7/1401
                                                        361/679.01
2015/0054789 A1    2/2015 Chang
2015/0345717 A1* 12/2015 Gerpheide ............... F21L 4/02
                                                         362/158

FOREIGN PATENT DOCUMENTS

CN      201096941 Y      8/2008
CN      203414659 U      1/2014
(Continued)

OTHER PUBLICATIONS

International Search Report of PCT application No. PCT/CN2022/096428 dated Aug. 8, 2022.
(Continued)

*Primary Examiner* — Insa Sadio
(74) *Attorney, Agent, or Firm* — Calfee, Halter & Griswold LLP

(57) ABSTRACT

The present disclosure provides a display device. The display device includes a transparent cover plate, a display panel, a frame assembly and an infrared touch assembly. The frame assembly includes an outer frame and a light filtering strip. The light filtering strip is provided with a light filtering part that presses at a front side edge of the transparent cover plate. The outer frame includes an outer frame body, a front frame wall and a rear frame wall. An outer side end of the front frame wall is connected to the outer frame body. An inner side end of the front frame wall presses on a front side
(Continued)

surface of the light filtering part. An outer side end of the rear frame wall is connected to the outer frame body. The infrared touch assembly is fixed between the front frame wall and the rear frame wall.

20 Claims, 6 Drawing Sheets

(58) Field of Classification Search
CPC . H05K 2201/09936; H05K 2203/0165; H05K 2203/0195; H05K 2203/081; H05K 2203/095; H05K 2203/107; H05K 2203/1476; H05K 2203/1484; H05K 2203/166; H05K 2203/167; H05K 3/22; H05K 1/189; H05K 13/0069; H05K 2201/10128; H05K 3/36; H05K 1/181; H05K 3/323; H05K 5/0069; H05K 7/1418; H05K 7/1424; H05K 7/20009; H05K 7/20963; H05K 1/02; H05K 13/04; H05K 2201/0154; H05K 2201/10189; H05K 3/0047; H05K 3/064; H05K 3/28; H05K 3/368; H05K 3/42; H05K 3/46; H05K 3/4691; G02F 1/1303; G02F 1/13452; G02F 1/136286; G02F 1/136295; H10K 71/00; H10K 71/191; H10K 50/84; H10K 50/841; H10K 59/1201; H10K 59/122; H10K 59/131; H10K 71/50; H10K 77/10; H10K 77/111; G09F 9/30; G09F 9/00; G09F 9/301; G09F 9/33; H01L 21/67017; H01L 21/68; H01L 21/67126; H01L 21/6838; B32B 37/10; B32B 38/1858; B32B 2457/20; B32B 37/003; B32B 38/1841; H01R 12/7076; H01R 12/52; H01R 12/7082; H01R 12/7088; H02G 1/06; H02G 1/08; H02G 1/085; H05B 33/02; H05B 33/06; H05B 33/10; H05B 33/12; Y10S 345/905; G06F 1/1601; G06F 1/184; G06F 2203/04103; G06F 3/041; H04M 1/0216; H04M 1/0266; H04N 5/64
See application file for complete search history.

(56) References Cited

FOREIGN PATENT DOCUMENTS

| | | |
|---|---|---|
| CN | 208271157 U | 12/2018 |
| CN | 210573711 U | 5/2020 |
| CN | 210895404 U | 6/2020 |
| CN | 211043762 U | 7/2020 |
| CN | 112114692 A | 12/2020 |
| CN | 212302156 U | 1/2021 |
| CN | 112558805 A | 3/2021 |
| CN | 215341038 U | 12/2021 |
| CN | 216561738 U | 5/2022 |
| JP | 2013160810 A | 8/2013 |

OTHER PUBLICATIONS

Written opinion of PCT application No. PCT/CN2022/096428 dated Aug. 8, 2022.
International Search Report of PCT application No. dated PCT/CN2022/120198 dated Dec. 28, 2022.
Written opinion of PCT application No. PCT/CN2022/120198 dated Dec. 28, 2022.

* cited by examiner

DISPLAY DEVICE

CROSS REFERENCE TO RELATED APPLICATIONS

The present disclosure is the U.S. national phase application of International Application No. PCT/CN2022/096428 filed on May 31, 2022, and claims priority to Chinese Patent Application No. 202111304644.6, filed on Nov. 5, 2021 and entitled "DISPLAY DEVICE", the entire contents of which are incorporated herein by reference for all purposes.

TECHNICAL FIELD

The present disclosure relates to the field of display technology, in particular to a display device.

BACKGROUND

An infrared touch whiteboard determines a writing position by capturing on/off of the signal of an infrared tube, which requires a height of a lamp bead to be higher than a surface of a tempered glass for writing, to ensure the effectiveness of a signal emission and reception of the lamp bead. However, a high touch height currently results in poor writing experience when writing.

It should be noted that the information disclosed in the above section is only intended to enhance the understanding of the background of the present disclosure, and thus can include information that does not constitute the prior art already known to those skilled in the art.

SUMMARY

According to one aspect of the present disclosure, a display device is provided. The display device inlcudes a transparent cover plate, a display panel, a frame assembly, and an infrared touch assembly, wherein the frame assembly includes an outer frame and a light filtering strip, the light filtering strip has a light filtering part that presses at a front side edge of the transparent cover plate, and the outer frame has an outer frame body, a front frame wall, and a rear frame wall, and wherein an outer side end of the front frame wall is connected to the outer frame body, an inner side end presses on a front side surface of the light filtering part, and an outer side end of the rear frame wall is connected to the outer frame body; wherein the infrared touch assembly is fixed between the front frame wall and the rear frame wall, and is provided with an infrared emitter or an infrared receiver; and wherein the display panel is fixed behind the transparent cover plate.

In some embodiments of the present disclosure, the light filtering strip further has a buffer part located on a side of the transparent cover plate, and the rear frame wall has a resisting part that resists against an outer side of the buffer part.

In some embodiments of the present disclosure, the buffer part includes a bearing section and a guiding section, a width of the bearing section is not smaller than half of a thickness of the transparent cover plate, and the guiding section is connected to a rear side end of the bearing section and tilts towards the outer side.

In some embodiments of the present disclosure, the bearing section resists against the resisting part on all outer side surface of the bearing section.

In some embodiments of the present disclosure, an angle between the guiding section and a side surface of the transparent cover plate ranges between 5° and 30°.

In some embodiments of the present disclosure, the front side edge of the transparent cover plate is provided with a chamfer, the buffer part further includes a transfering section, and the transfering section is parallel to the chamfer at the front side edge of the transparent cover plate, and wherein a front side end of the transfering section is connected to the light filtering part, and a rear side end of the transfering section is connected to a front side end of the bearing section.

In some embodiments of the present disclosure, a thickness of the buffer part is not smaller than 1 millimeter.

In some embodiments of the present disclosure, a size of the buffer part in a front-rear direction is 0.9-1.3 times a thickness of the transparent cover plate.

In some embodiments of the present disclosure, the front frame wall is provided with the securing protrusion protruding towards a rear side, and a thickness of a rear side end of the securing protrusion is greater than a thickness of a front side end of the securing protrusion; and the front side surface of the light filtering part is provided with the securing groove that matches with the securing protrusion, and the securing protrusion is inserted into the securing groove.

In some embodiments of the present disclosure, the front frame wall is provided with the securing protrusion protruding towards a rear side, the front side surface of the light filtering part is provided with the securing groove that matches with the securing protrusion, and the securing protrusion is inserted into the securing groove; the light filtering strip further includes a limit protrusion protruding towards an outer side, and a resisting part resists against a rear side surface of the limit protrusion.

In some embodiments of the present disclosure, the rear frame wall further includes a rear frame wall body and a connection wall, an outer side end of the rear frame wall body is connected to the outer frame body, and the connection wall is connected to the rear frame wall body and extends to connect with a resisting part.

In some embodiments of the present disclosure, the rear frame wall body is provided on a rear side of the transparent cover plate.

In some embodiments of the present disclosure, the connection wall includes a first connection wall and a second connection wall, a rear side end of the first connection wall is connected to a front side surface of the rear frame wall body, a front side end of the first connection wall is connected to an outer side end of the second connection wall, and an inner side end of the second connection wall is connected to the resisting part.

In some embodiments of the present disclosure, an avoidance groove is formed between the first connection wall, the second connection wall, and the rear frame wall body, the buffer part includes a bearing section and a guiding section, the guiding section is connected to a rear side end of the bearing section and extends towards a direction of the avoidance groove.

In some embodiments of the present disclosure, the frame assembly further includes a supporting member, and the supporting member is connected to the outer frame and bonded to a rear side edge of the transparent cover plate through an elastic material.

In some embodiments of the present disclosure, the supporting member includes a first supporting vertical wall, a supporting transverse wall, and a second supporting vertical wall, the first supporting vertical wall is connected to a front side end of the supporting transverse wall and extends towards an inner side, the first supporting vertical wall and the rear side edge of the transparent cover plate are bonded through the elastic material, the second supporting vertical wall is connected to a rear side end of the supporting transverse wall and extends towards an outer side, and the second supporting vertical wall is connected to the outer frame.

In some embodiments of the present disclosure, the elastic material is double-sided adhesive, and a width of an adhesive surface between the double-sided adhesive and the transparent cover plate is 1.1-2.0 times a width of a contact surface between the light filtering part and the transparent cover plate.

In some embodiments of the present disclosure, the elastic material is a foam tape, and a compression rate of the foam tape is 40%-60%.

In some embodiments of the present disclosure, a sealing groove is provided on a rear side surface of the light filtering part, a sealing element is provided inside the sealing groove, and an interference fit is used between the sealing element and the transparent cover plate.

In some embodiments of the present disclosure, a width of the sealing groove is not smaller than 0.5 times a width of a contact surface between the light filtering part and the transparent cover plate.

In some embodiments of the present disclosure, a depth of the sealing groove is not smaller than 0.2 millimeters.

In some embodiments of the present disclosure, the sealing groove is arranged away from the outer frame body.

In some embodiments of the present disclosure, a compression amount of the sealing element is between 40% and 60%.

In some embodiments of the present disclosure, a friction coefficient between the sealing element and the transparent cover plate ranges from 1.0 to 3.5.

In some embodiments of the present disclosure, a surface roughness of the sealing element close to the transparent cover plate is within a range of 4-12 microns.

In some embodiments of the present disclosure, the sealing element is hydrophobic.

In some embodiments of the present disclosure, the sealing element is a silicone strip.

In some embodiments of the present disclosure, a sealing groove is provided on a rear side surface of the light filtering part, the sealing groove is filled with sealant, and the transparent cover plate and the filtering part are sealed and connected through the sealant.

It should be understood that the general description in the above and the detailed description in the following are only illustrative and explanatory, and do not limit the present disclosure.

BRIEF DESCRIPTION OF THE DRAWINGS

The drawings, which are incorporated in and constitute a part of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

EXPLANATIONS OF REFERENCE NUMERALS

Figure 1:
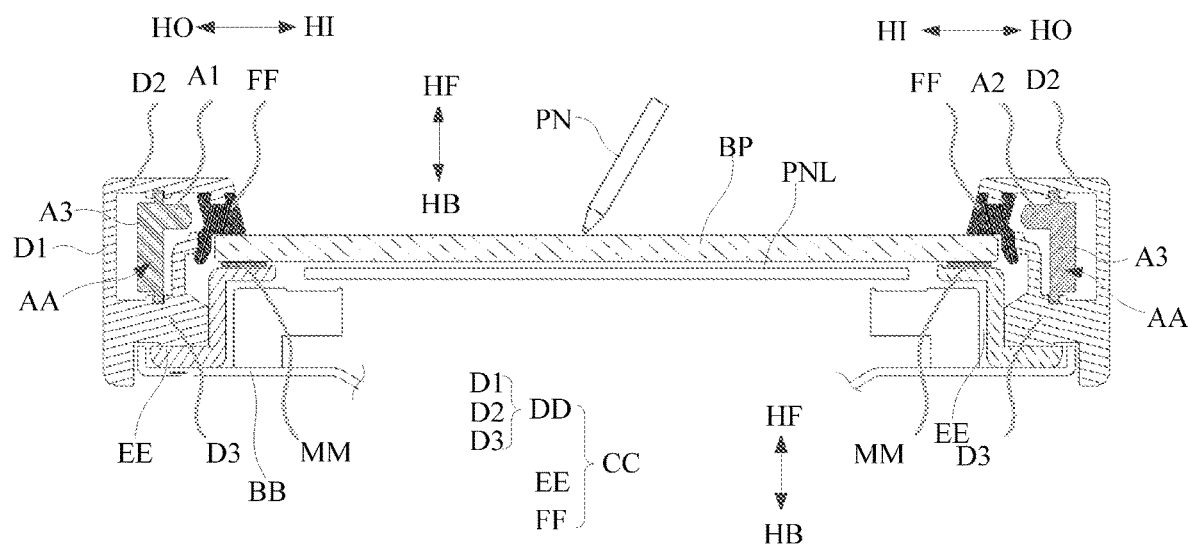
FIG. 1 is a schematic diagram of a structure of a display device according to embodiments of the present disclosure.

BP. transparent cover plate; PNL. display panel; AA. infrared touch assembly; A1. infrared emitter; A2. infrared receiver; A3. circuit board; AG. wiring cavity; CC. frame assembly; DD. outer frame; D1. outer frame body; D2. front frame wall; D21. securing protrusion; D22. first protruding platform; D2G. first groove; D3. rear frame wall; D31. rear frame wall body; D32. connection wall; D321. first connection wall; D322. second connection wall; D33. resisting part; D34. second protruding platform; D3G. second groove; EE. supporting member; E1. first supporting vertical wall; E2. second supporting vertical wall; E3. supporting transverse wall; FF. light filtering strip; F1. light filtering part; F1G. securing groove; F2. buffer part; F21. transfering section; F22. bearing section; F23. guiding section; F3. limit protrusion; BB. back shell; HF. front side; HB. rear side; HI. inner side; HO. outer side.

DETAILED DESCRIPTION

Example embodiments will now be described more fully with reference to the drawings. Example embodiments, however, can be embodied in a variety of forms and should not be construed as being limited to examples set forth herein. Instead, these embodiments are provided so that the present disclosure will be thorough and complete, and will fully convey concepts of the example embodiments to those skilled in the art. The same reference numerals in the drawings represent the same or similar structures, and thus their detailed descriptions will be omitted. In addition, the drawings are only illustrative and are not necessarily drawn to scale.

Terms "one", "a", "the", "said", and "at least one" are used to indicate the existence of one or more elements/components/etc. Terms "include" and "has" are used to indicate open inclusion and refer to the existence of additional elements/components/etc. in addition to the listed ones. Terms "first", "second", and "third" are only used as reference numerals and are not intended to limit the quantity of objects.

The present disclosure provides a display device that can perform infrared touch. The display device can be an electronic whiteboard, a conference tablet, an interactive display board, or other feasible display devices. Referring to FIG. 1, the display device includes a transparent cover plate BP, a display panel PNL, a frame assembly CC, and an infrared touch assembly AA. In some embodiments, the transparent cover plate BP is arranged in front of the display panel PNL to protect the display panel PNL. The frame assembly CC is arranged around the display device to provide a border frame. The infrared touch assembly AA is arranged in the frame assembly CC and forms a touch surface in front of the transparent cover plate BP.

Referring to FIG. 1, in embodiments of the present disclosure, unless otherwise indicated, a side of the display device used for displaying an image is defined as a front side HF, and a side opposite to the front side is defined as a rear side HB. For example, the transparent cover plate BP is located on a front side of the display panel PNL, and the display panel PNL emits light towards the front side to display the image.

In embodiments of the present disclosure, unless otherwise indicated, a direction away from a center of a display plane is defined as an outer side HO, and a direction close to the center of the display plane is defined as an inner side HI. For example, the frame assembly CC is located on an outer side of the transparent cover plate BP.

Figure 2:
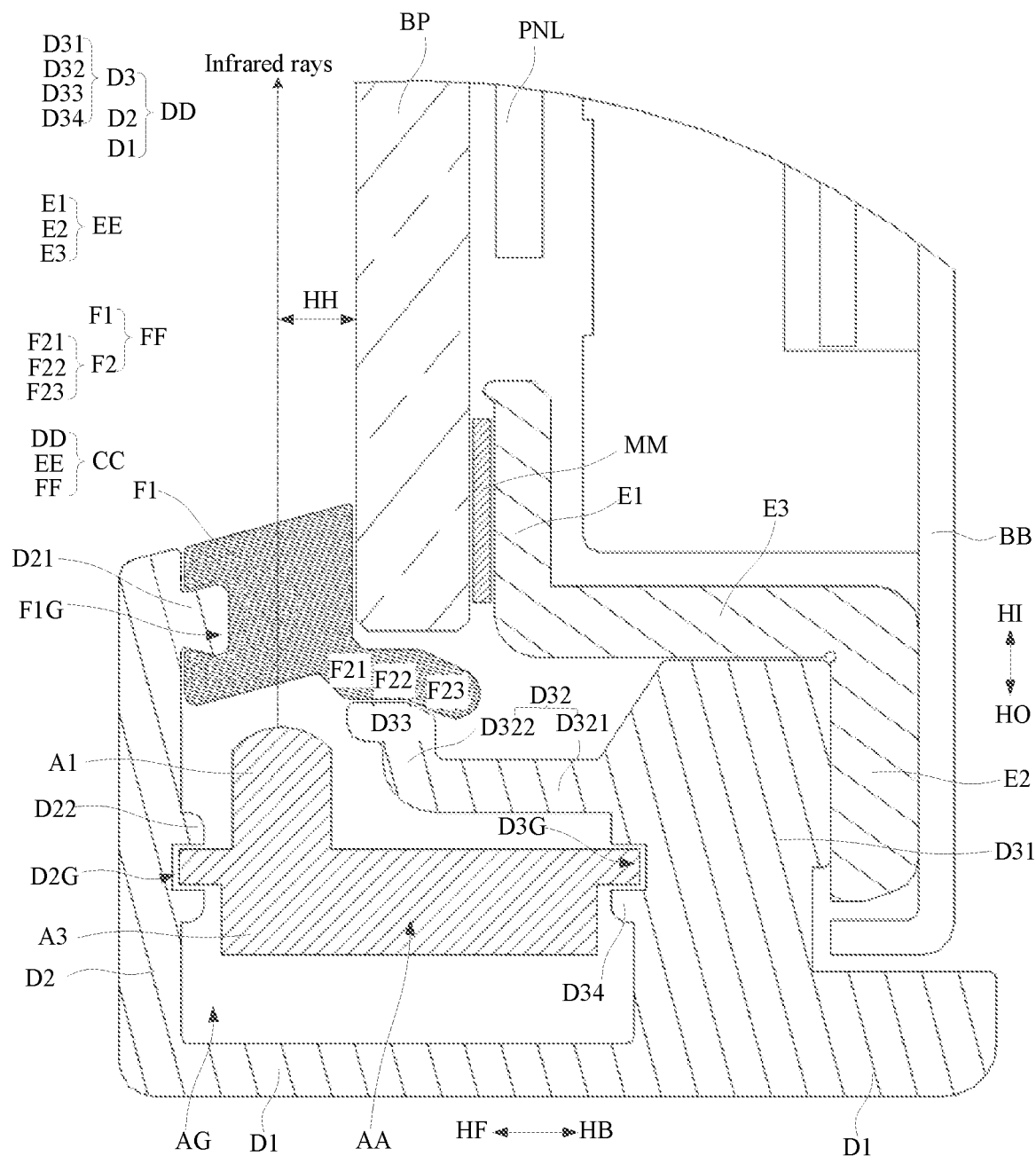
FIG. 2 is a schematic diagram of a local structure of a display device according to embodiments of the present disclosure.
Figure 3:
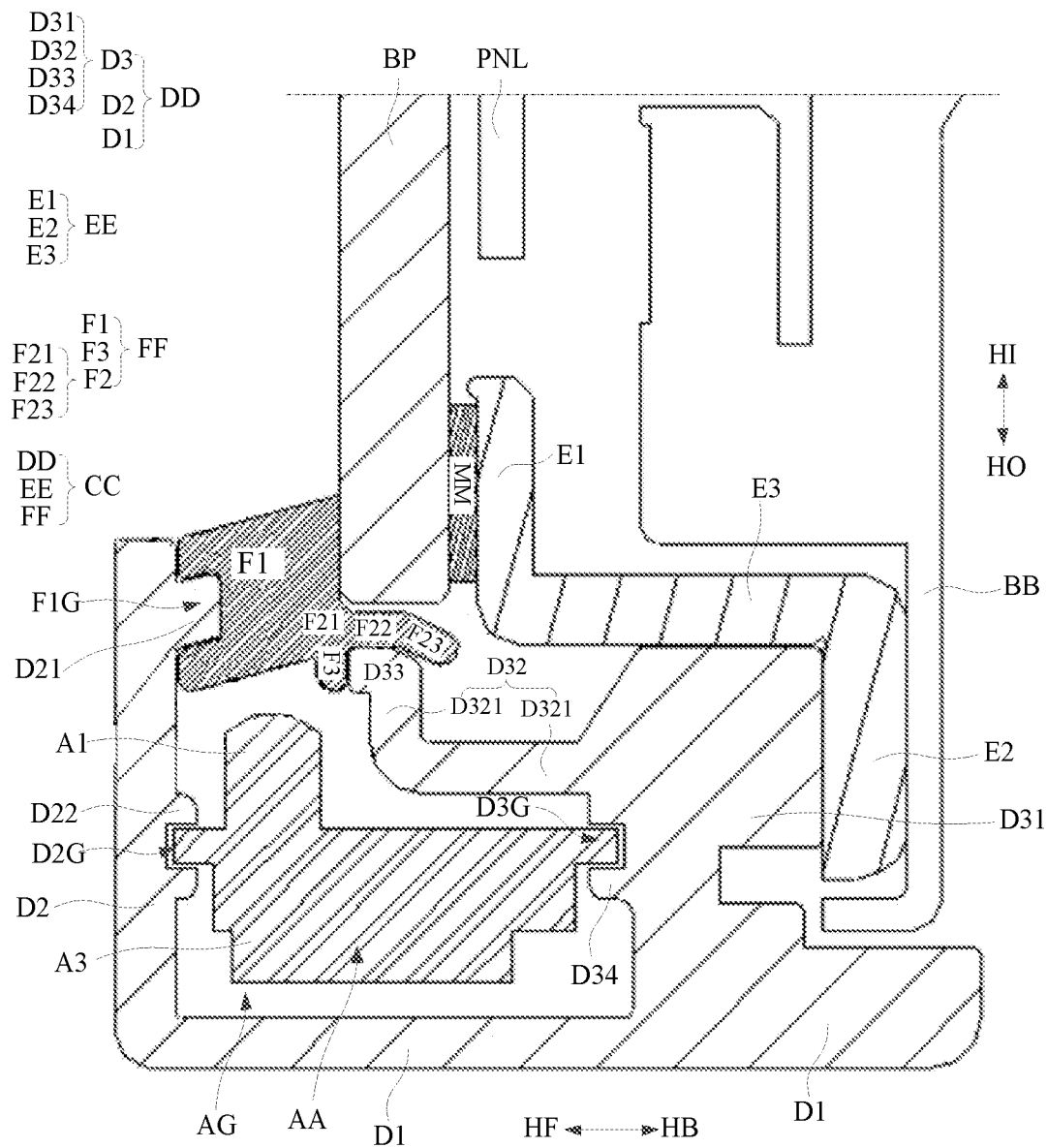
FIG. 3 is a schematic diagram of a local structure of a display device according to embodiments of the present disclosure.

Referring to FIGS. 2 and 3, in the display device of the present disclosure, the frame assembly CC includes an outer frame DD and a light filtering strip FF.

The light filtering strip FF has a light filtering part F1 that presses at a front side edge of the transparent cover plate BP.

The outer frame DD has a outermost outer frame body D1, as well as a front frame wall D2 and a rear frame wall D3. An outer side end of the front frame wall D2 is connected to the outer frame body D1, and an inner side end thereof presses on a front side surface of the light filtering part F1. An outer side end of the rear frame wall D3 is connected to the outer frame body D1. The infrared touch assembly AA is fixed between the front frame wall D2 and the rear frame wall D3, and is provided with an infrared emitter A1 or an infrared receiver A2, which exactly face the light filtering part F1. The display panel PNL is fixed behind the transparent cover plate BP.

In the display device of the present disclosure, the light filtering strip FF is directly contact with and connected to the transparent cover plate BP, and there is no adhesive layer (such as foam double-sided adhesive) or other film layers used for fastening between the two. In this way, the light filtering part F1 can be made closer to a front side surface of the transparent cover plate BP. The infrared rays emitted by the infrared emitter A1 can pass through the light filtering part F1 to enter the infrared receiver A2 in an opposite frame assembly. By detecting the obstruction of infrared rays by an external object such as a finge and a stylus, it is possible to locate the external object and achieve a touch operation. Due to the fact that the light filtering part F1 is closer to the front side surface of the transparent cover plate BP, the infrared rays used for touch are closer to the front side surface of the transparent cover BP, which can reduce a touch height HH of the infrared touch and improve the touch experience. In the present disclosure, in order to achieve the fixation of the light filtering strip FF, the front frame wall D2 of the frame assembly CC can be pressed onto a front side surface of the light filtering part F1, so that the light filtering part F1 can be sandwiched between the transparent cover plate BP and the front frame wall D2, overcoming the problem of the unstable arrangement of the light filtering strip FF due to non adhesion between the light filtering part F1 and the transparent cover plate BP. In the related art, the buffer foam double-sided adhesive needs to be provided between the light filtering part and the transparent cover plate for bonding, so as to achieve the fixation of the light filtering part, which, on the one hand, significantly increases a distance between the infrared rays and the transparent cover plate, causing the touch height to be rised and resulting in poor writing experience. On the other hand, attaching the buffer foam double-sided adhesive requires precise alignment, which makes an installation process more complex and is not conducive to improving an assembly speed.

In some embodiments of the present disclosure, the light filtering strip FF further has a buffer part F2 located on an outer side of the transparent cover plate BP. The rear frame wall D3 further has a resisting part D33 that resists against an outer side of the buffer part F2.

The buffer part F2 of the light filtering strip FF is arranged between the resisting part D33 of the frame assembly CC and the transparent cover plate BP, which prevents direct contact between the resisting part D33 of the frame assembly CC and the transparent cover plate BP. During the touch operation, the transparent cover plate BP is easily vibrated when being knocked, however, the transparent cover plate BP will not directly contact with, collide with, or rub against the outer frame DD when vibrating, thereby avoiding abnormal noise caused by the contact between the outer frame DD and the transparent cover plate BP. In the related art, the outer frame is in direct contact with the edge of the transparent cover plate, and the outer frame is made of metal material, therefore, the transparent cover plate rubs against the outer frame when being touched, which produces a noticeable abnormal noise and reduces the user experience.

In some embodiments, the frame assembly CC further includes a supporting member EE, which is connected to the outer frame DD and bonded to a rear side edge of the transparent cover plate BP through an elastic material. In this way, the vibration generated by the transparent cover plate BP during the touch can be at least partially absorbed by the elastic material. On the one hand, the vibration of the transparent cover plate BP can be reduced, and on the other hand, the abnormal noise caused by rubbing between the transparent cover plate BP and the supporting member EE can be avoided.

Therefore, the display device of the present disclosure can not only reduce the touch height, but also reduce or eliminate the abnormal noise during the touch. It can be understood that in the present disclosure, the touch includes that a display device changes a screen in response to a touch action. For example, a display device can track a trajectory of the external object such as a finger, a stylus, etc. through touch and display the trajectory, achieving the effect of writing on the display device.

A further description and explanation of the structure, principle, and effect of the display device of the present disclosure will be provided in the following in conjunction with the drawings.

In the present disclosure, a material of the light filtering strip FF can be a plastic material, such as PC (polycarbonate), etc. The infrared touch assembly AA can include an infrared emitting unit and an infrared receiving unit. The infrared emitting unit and the infrared receiving unit are respectively arranged in two opposite outer frames DD. In some embodiments, the infrared emitting unit can include a circuit board A3 and an infrared emitter A1 (such as an infrared lamp bead) fixed on the circuit board A3. The infrared receiving unit includes a circuit board A3 and an infrared receiver A2 (such as an infrared sensor) fixed on the circuit board A3. Among the two outer frames DD relatively arranged, one outer frame is provided with the infrared emitting unit, and the other is provided with the infrared receiving unit. In some embodiments, the infrared rays emitted by the infrared emitter A1 can pass, after being filtered by the light filtering strip FF, through the front side of the transparent cover plate BP and through the light filtering strip FF on the other side, and then be detected by the infrared receiver A2. When an optical path between the infrared emitter A1 and the infrared receiver A2 is obstructed, such as by the stylus or the finger, the infrared receiver A2 cannot detect the infrared rays, and based on which, the controller of the display device can determine a position of the obstruction on the transparent cover plate BP, achieving the positioning of the obstruction.

In some embodiments of the present disclosure, as shown in FIGS. 2 and 3, an inner side surface and an outer side surface of the light filtering part F1 can be parallel to each other, so as to ensure that the portion of the light filtering part F1 used for filtering the infrared rays has the same thickness (the size along an inner-outer direction).

In some embodiments of the present disclosure, the buffer part F2 includes a bearing section F22, and a width (the size along a front-rear direction) of the bearing section F22 is not smaller than half of a thickness (the size along the front-rear direction) of the transparent cover plate BP. The resisting part D33 at least partially resists against an outer side surface of the bearing section F22. In this way, when the display device is placed vertically, for example, by hanging on a wall or standing upright through a bracket as an electronic whiteboard, the bearing section F22 located below can bear the transparent cover plate BP and ensure that there is a larger bearing area between the bearing section F22 and the transparent cover plate BP, avoiding the sliding of the transparent cover plate BP due to a smaller bearing width (the size of the contact surface along a front-rear direction). In some embodiments, a width of the bearing section F22 is not smaller than ¾ of the thickness of the transparent cover plate BP.

In some embodiments of the present disclosure, an inner side surface of the bearing section F22 is parallel to an outer side surface of the transparent cover plate BP.

In some embodiments of the present disclosure, the bearing section F22 resists against the resisting part D33 on all its outer side surface.

In some embodiments of the present disclosure, as shown in FIGS. 2 and 3, the buffer part F2 can further include a guiding section F23. The guiding section F23 is connected to a rear side end of the bearing section F22 and tilts towards the outer side. In other words, along a direction towards the rear side HB, the guiding sections F23 of the light filtering strips FF relatively arranged are as a whole in an expanded shape. In this way, when assembling the transparent cover plate BP, the guiding section F23 can guide the transparent cover plate BP to slide to fit with the light filtering part F1, thereby reducing the difficulty of assembly.

In some embodiments of the present disclosure, an angle between the guiding section F23 and a side surface of the transparent cover plate BP is between 5° and 30°, which can ensure that the guiding section F23 has a strong guiding effect.

In some embodiments of the present disclosure, the outer side surface of the guiding section F23 at least partially resists against the resisting part D33. In this way, the resisting part D33 can provide support for the guiding section F23, so that the guiding section F23 can maintain its shape to guide the transparent cover plate BP. In some embodiments of the present disclosure, the outer side surface of the guiding section F23 can also be completely non-contact with the resisting part D33, and only when assembling the transparent cover plate BP, the guiding section F23 is bent under the pressure of the transparent cover plate BP to contact the resisting part D33.

In some embodiments of the present disclosure, the inner side surface of the resisting part D33 is provided with a chamfer that matches with the outer side surface of the guiding section F23, so as to effectively support the guiding section F23.

In some embodiments of the present disclosure, a front side edge of the transparent cover plate BP is provided with a chamfer. The buffer part F2 further includes a transfering section F21, and the transfering section F21 is parallel to the chamfer at the front side edge of the transparent cover plate BP. A front side end of the transfering section F21 is connected to the light filtering part F1, and a rear end of the transfering section F21 is connected to a front side end of the bearing section F22. In this way, a matching degree between the buffer part F2 and the transparent cover plate BP can be improved, achieving a better buffering effect.

In some embodiments of the present disclosure, a thickness of the buffer part F2 is not smaller than 1 millimeter. In this way, the light filtering strip FF as a whole can be made by an extrusion process, avoiding the increase in the extrusion cost due to too small thickness of the buffer F2.

In some embodiments of the present disclosure, the size of the buffer part F2 in the front-rear direction is 0.9 to 1.3 times the thickness of the transparent cover plate BP, for example, it can be 1.1 to 1.2 times the thickness of the transparent cover plate BP. In this way, it can not only ensure the bearing strength of the buffer part F2 for the transparent cover plate BP, but also avoid the increase in the extrusion cost caused by that the size of the buffer part F2 is too long in the front-rear direction.

Referring to FIGS. 2 and 3, the outer frame DD has an outer frame body D1, a front frame wall D2, and a rear frame wall D3. In some embodiments, the outer frame body D1 is located on the outermost side of the outer frame DD, and the front frame wall D2 and the rear frame wall D3 are both located on the inner side of the outer frame body D1 and connected to the outer frame body D1.

In some embodiments of the present disclosure, the outer side surface of the outer frame body D1 can be substantially parallel to a normal of the display device. In some embodiments, the outer side surface of the outer frame body D1 can be inclined at a certain included angle relative to a normal direction of the display device, for example, at an included angle of 0°-10°, so that the outer side surface of the outer frame body D1 shows a certain inclination angle.

An outer side end of the front frame wall D2 can be connected to the outer frame body D1, and an inner side end of the front frame wall D2 can be in contact with and connected to the light filtering part F1, so that the light filtering part F1 presses on the front side edge of the transparent cover plate BP. In some embodiments, one of the front frame wall and the light filtering part is provided with a securing protrusion, and the other is provided with a securing groove. The securing protrusion and the securing groove are matched with each other, so as to connect the front frame wall to the light filtering part.

In some embodiments of the present disclosure, the front frame wall D2 is provided with a securing protrusion D21 protruding towards the rear side. The front side surface of the light filtering part F1 is provided with a securing groove F1G that matches with the securing protrusion D21. The securing protrusion D21 is inserted into the securing groove F1G. In this way, on the one hand, the bonding strength between the front frame wall D2 and the light filtering strip FF can be improved, so that the light filtering strip FF can be better pressed and fixed. On the other hand, during assembly, the light filtering strip FF can be pre fixed on the outer frame DD, and the transparent cover plate BP is assembled after that.

In some embodiments of the present disclosure, a thickness (the size along an inner-outer direction) of the rear side end of the securing protrusion D21 is greater than a thickness (the size along an inner-outer direction) of the front side end of the securing protrusion D21. The size of the securing groove F1G matches with the size of the securing protrusion D21, and a height of a groove bottom (the size of the groove bottom of the securing groove F1G in the inner-outer direction) is greater than a height of a groove opening (the size of the groove opening of the securing groove F1G in the inner-outer direction). In this way, when the securing protrusion D21 is inserted into the securing groove F1G, the securing protrusion D21 will not be able to detach from the groove opening of the securing groove F1G, thereby ensuring the bonding reliability and bonding strength between the light filtering strip FF and the outer frame DD. In some embodiments, the securing protrusion D21 has a trapezoidal shape (such as isosceles trapezoid, right angle trapezoid, etc.) along a cross-section perpendicular to an extension direction of the securing protrusion D21, and a bottom edge of the trapezoid is on the rear side. In some embodiments, the securing protrusion D21 can also have a T-shaped or T-like shaped structure.

In some embodiments of the present disclosure, the light filtering strip FF further includes a limit protrusion F3 protruding towards the outer side. The resisting part D33 of the rear frame wall D3 resists against a rear side surface of the limit protrusion F3. In this way, the light filtering strip FF is matched with both the securing protrusion D21 and the resisting part D33, thereby ensuring the bonding reliability and the bonding strength between the light filtering strip FF and the outer frame DD.

In some embodiments of the present disclosure, the inner side surface of the securing groove F1G (i.e. the inner side surface of the securing protrusion D21) is parallel to the inner side surface of the light filtering part F1.

In some embodiments of the present disclosure, the inner side surface of the light filtering part F1 is coplanar with the inner side surface of the front frame wall D2. For example, the inner surface of the light filtering part F1 has a certain slope angle, so that two opposite light filtering parts F1 take on a wide opening facing the front side. In some embodiments, in a direction facing the front side, the inner side surface of the light filtering part F1 extends towards the outer side, and correspondingly, the inner side surface of the front frame wall D2 also takes on the same slope angle, and a rear side edge of the inner side surface of the front frame wall D2 is flush with a front side edge of the inner side surface of the light filtering part F1.

In some embodiments of the present disclosure, the rear side edge of the inner side surface of the front frame wall D2 is flush with the front side edge of the inner side surface of the light filtering part F1.

In some embodiments of the present disclosure, the rear frame wall D3 further includes a rear frame wall body D31 and a connection wall D32. In some embodiments, an outer side end of the rear frame wall body D31 is connected to the outer frame body D1 and extends to the inner side. The connection wall D32 is connected to the rear frame wall body D31 and extends to connect with the resisting part D33. In this way, the resisting part D33 is connected to the outer frame body D1 through the connection wall D32 and the rear frame wall body D31.

In some embodiments of the present disclosure, the rear frame wall body D31 is provided on the rear side of the transparent cover plate BP. The connection wall D32 is connected to the front side surface of the rear frame wall body D31 and extends to connect with the resisting part D33.

In some embodiments, the connection wall D32 includes a first connection wall D321 and a second connection wall D322. A plane where the first connection wall D321 is located is provided along the front-rear direction. A plane where the second connection wall D322 is located is provided along the inner-outer direction. In other words, the first connection wall D321 extends in the front-rear direction along a cross-section that is perpendicular to an extension direction of the first connection wall D321. The second connection wall D322 extends in the inner-outer direction along a cross-section that is perpendicular to an extension direction of the second connection wall D322.

In some embodiments, an avoidance groove is formed between the first connection wall, the second connection wall, and the rear frame wall body. The guiding section extends towards a direction of the avoidance groove. In this way, on the one hand, it can avoid spatial interference between the connection walls and the guiding section. Even if the guiding section is slightly longer due to a preparation process error, the guiding section can still extend into the avoidance groove without being obstructed by the connection walls. Therefore, the preparation accuracy of the connection walls and light filtering strip can be reduced, improving its process window, and thereby reducing the cost of the display device. On the other hand, when the transparent cover plate is guided by the guiding section for facilitating assembly, the avoidance groove can provide a certain space for the deformation of the guiding section, thereby facilitating the assembly process of the transparent cover plate. It can be understood that the extension of the guiding section towards the direction for the avoidance groove does not mean that the guiding section dives into the avoidance groove. The guiding section can either be completely outside the avoidance groove or partially inside the avoidance groove.

In some embodiments, a rear side end of the first connection wall D321 is connected to a front side surface of the rear frame wall body D31, a front side end of the first connection wall D321 is connected to an outer side end of the second connection wall D322, and an inner side end of the second connection wall D322 is connected to the resisting part D33.

In some embodiments of the present disclosure, a first groove D2G is provided on a rear side surface of the front frame wall D2, and a second groove D3G is provided on a front side surface of the rear frame wall D3. The infrared touch assembly AA includes a circuit board A3 and an infrared emitter A1 or an infrared receiver A2, arranged on the circuit board A3.

Both sides of the circuit board A3 are respectively inserted into the first groove D2G and the second groove D3G. The infrared emitter A1 or the infrared receiver A2 exactly faces the light filtering part F1, so as to emit infrared rays from the light filtering part F1 or receive infrared rays transmitted through the light filtering part F1. In some embodiments, the first groove D2G and the second groove D3G are arranged, exactly facing each other along the front-rear direction.

In some embodiments of the present disclosure, a first protruding platform D22 is provided on the rear side surface of the front frame wall D2, the first protruding platform D22 protruding to the rear side. The first groove D2G is provided on the first protruding platform D22. In this way, it can avoid local thinning of the front frame wall D2 caused by the first groove D2G, thereby ensuring that the front frame wall D2 can still maintain high strength even with the first groove D2G.

In some embodiments of the present disclosure, the second groove D3G is provided on the front side surface of the rear frame wall body D31.

In some embodiments, a second protruding platform D34 is provided on the front side surface of the rear frame wall body D31, the second protruding platform D34 protruding to the front side. The second groove D3G is provided on the second protruding platform D34.

In some embodiments, the second groove D3G is provided on an outer side of the first connection wall D321.

In some embodiments, the first connection wall D321 is also connected to the second protruding platform D34.

In some embodiments, a front side edge of an inner side of the rear frame wall body D31 is provided with a chamfer, so as to reduce a weight of the rear frame wall body D31 and save materials. Furthermore, an outer side end of the chamfer intersects with an inner side edge of the rear side end of the first connection wall D321, so as to reduce the material consumption and the weight of the rear frame wall body D31 as much as possible, while ensuring the connection strength between the first connection wall D321 and the rear frame wall body D31.

In some embodiments of the present disclosure, a wiring cavity AG is formed between the circuit board A3 and the outer frame body D1. Signal ports of circuit board A3 are provided in the wiring cavity AG. In this way, when different outer frames DDs are spliced together, the circuit board A3 in each outer frame DD can be electrically connected through the signal ports.

In some embodiments of the present disclosure, the supporting member EE includes a first supporting vertical wall E1, a supporting transverse wall E3, and a second supporting vertical wall E2. A plane where the supporting transverse wall E3 is located extends along the front-rear direction, and planes where the first supporting vertical wall E1 and the second supporting vertical wall E2 are located extend along the inner-outer direction. In other words, on a cross-section perpendicular to an extending direction of the supporting member EE, cross-sections of the first supporting vertical wall E1 and the second supporting vertical wall E2 extend in the inner-outer direction, and a cross-section of the supporting transverse wall E3 extends in the front-rear direction.

The first supporting vertical wall E1 is connected to a front side end of the supporting transverse wall E3 and extends along the front-rear direction. The first supporting vertical wall E1 and the rear side edge of the transparent cover plate BP are bonded by using an elastic material MM. The second supporting vertical wall E2 is connected to a rear side end of the supporting transverse wall E3 and extends towards the outer side. The second supporting vertical wall E2 is connected to the outer frame DD.

In some embodiments of the present disclosure, a material that is both elastic and adhesive can be provided between the first supporting vertical wall E1 and the rear side edge of the transparent cover plate BP, to facilitate adhesion between the first supporting vertical wall E1 and the transparent cover plate BP. In some embodiments, double-sided adhesive is provided between the first supporting vertical wall E1 and the rear side edge of the transparent cover plate BP. In some embodiments, a width (the size along the inner-outer direction) of an adhesive surface between the double-sided adhesive and the transparent cover plate is 1.1-2.0 times, for example, 1.3-1.15 times, a width (the size along the inner-outer direction) of the contact surface between the light filtering part and the transparent cover plate.

In some embodiments, a composite layer formed through an adhesive layer and an elastic material layer can be provided between the first supporting vertical wall E1 and the rear side edge of the transparent cover plate BP, to facilitate adhesion between the first supporting vertical wall E1 and the transparent cover plate BP. In some embodiments, stacked adhesive layer, buffer foam layer, and adhesive layer can be provided between the first supporting vertical wall E1 and the rear side edge of the transparent cover plate BP. In other words, the elastic material is the foam tape. In the assembled display device, the foam tape is compressed to provide rebound force to the transparent cover plate BP (as pressure applied to the transparent cover plate BP), thereby ensuring a long-lasting and tight fit between the transparent cover plate BP and the light filtering part F1, avoiding gaps between the transparent cover plate BP and the light filtering part F1, and thus preventing moisture from entering the display device from the gaps between the transparent cover plate BP and the light filtering part F1.

In some embodiments, a compression rate of the foam tape is 40%-60%. The higher the hardness of the foam tape, the lower the compression rate of the foam tape, as long as the foam tape can provide sufficient pressure for the transparent cover plate BP. In some embodiments, the compression rate of the foam tape refers to a ratio of a thickness reduction value (a thickness without compression-a thickness in use) of the foam tape in use to a thickness value of the foam tape without compression.

In some embodiments of the present disclosure, an inner side surface of the rear frame wall body D31 can be provided along the front-rear direction, and an outer side surface of the supporting the transverse wall E3 can resist against the inner side surface of the rear frame wall body D31. In this way, the rear frame wall body D31 can position and support the supporting transverse wall E3, improving the bonding strength and stability between the supporting member EE and the outer frame DD.

In some embodiments of the present disclosure, an assembly surface is provided on a rear side surface of the rear frame wall body D31, and a front side surface of the second supporting vertical wall E2 can fit with the assembly surface.

In some embodiments of the present disclosure, the second supporting vertical wall E2 can be fixed to the rear frame wall body D31, for example, through screws or adhesive.

In some embodiments of the present disclosure, a thickness (the size along the front-rear direction) of the rear frame wall body D31 can be greater than a thickness (the size along the inner-outer direction) of the outer frame body D1. For example, the thickness of the rear frame wall body D31 can be 1.2-2 times a maximum thickness of the outer frame body D1. In this way, on the one hand, the strength of the rear frame wall body D31 itself can be improved, so that the rear frame wall body D31 can have sufficient strength to bear the forces transmitted from the second supporting vertical wall E2 and the resisting part D33. On the other hand, such arrangement can also increase a bonding area between the rear frame wall body D31 and the outer frame body D1, thereby enhancing the bonding strength between the two. As a result, the outer frame DD is made to have sufficient strength to secure the transparent cover plate BP and withstand the vibration generated when the transparent cover plate BP is knocked (such as the collision between the touch pen and the transparent cover plate BP).

In some embodiments of the present disclosure, the display device is further provided with a back shell BB, and the back shell BB is located behind the display panel PNL and fixed to the frame assembly CC.

In some embodiments of the present disclosure, as shown in FIG. 2, a gap can be reserved between the second supporting vertical wall E2 and the outer frame body D1. An edge of the back shell BB can be bent and inserted into the reserved gap.

In some embodiments of the present disclosure, as shown in FIGS. 4 to 7, a sealing groove is provided on the rear side surface of the light filtering part F1, and a sealing element GG is provided inside the sealing groove. The interference fit is used between the sealing element and the transparent cover plate. In this way, by using the interference fit between the sealing element GG and the transparent cover plate BP, there will be no gap between the transparent cover plate BP and the sealing element GG due to looseness or aging. The possible gap will be filled through volume recovery from the sealing element GG. Such arrangement can prevent moisture from flowing into the interior of the display device along a gap between the sealing element GG and the transparent cover plate BP, thereby avoiding the potential harm of the moisture to electronics inside the display device.

In some embodiments, the sealing groove is filled with the sealing element. Furthermore, a width of the sealing groove is not smaller than 0.5 times a width of the contact surface between the light filtering part and the transparent cover plate. In this way, the waterproof effect can be improved by increasing the width of the contact surface between the sealing element and the transparent cover plate as much as possible.

In some embodiments, a depth of the sealing groove is not smaller than 0.2 millimeters. In this way, the sealing element filled in the sealing groove can have a larger thickness by increasing the thickness of the sealing groove, which in turn makes the sealing element have greater volume recovery ability, and a maximum gap that can be eliminated by the sealing element will be larger, thereby improving the waterproof effect and the reliability of the sealing element.

In some embodiments, the sealing groove is provided away from the outer frame body. In this way, a depth of an opening facing the outside environment in the contact area between the light filtering part F1 and the transparent cover plate BP can be as small as possible, thereby avoiding residual moisture in a gap possibly formed at the opening and accumulated solid objects in the gap possibly formed at the opening, reducing the aging rate of the light filtering part F1, and avoiding the gap possibly formed between the light filtering part F1 and the transparent cover plate BP being persistently maintained. In addition, it is beneficial for improving the waterproof effect and the reliability.

In some embodiments, a compression amount of the sealing element is between 40% and 60%. In this way, the sealing element will have good volume recovery ability, so that possible gaps can be filled effectively by restoring volume and the waterproof effect can be achieved. In some embodiments, the compression amount of the sealing element refers to a ratio of a thickness reduction value (a thickness without compression—a thickness in use) of the sealing element in use to a thickness of the sealing element without being used.

In some embodiments, a friction coefficient between the sealing element and the transparent cover plate ranges from 1.0 to 3.5. In this way, the bonding strength between the sealing element GG and the transparent cover plate BP can be improved, thereby improving the waterproof effect.

In some embodiments, a surface roughness of the sealing element close to the transparent cover plate is within a range of 4-12 microns. In this way, the sealing element GG can have good hydrophobic ability, thereby improving the waterproof effect.

In some embodiments, the sealing element can also be prepared or surface modified by using hydrophobic materials, which enables the sealing element to be hydrophobic, thereby improving the waterproof effect of the sealing element.

In some embodiments, the sealing element is a silicone strip. Furthermore, the silicone strip can be a prefabricated silicone strip that can be adhesived into the sealing groove by using the adhesive (such as double-sided adhesive). In some embodiments, the sealing element can also be a prefabricated strip part that is prepared from other materials.

In some embodiments, the sealing groove is provided on the rear side surface of the light filtering part, and the sealing groove is filled with sealant. The transparent cover plate and the light filtering part are sealed and connected through the sealant. It is possible to fill the sealing groove with a certain amount of elastic sealant by adding (such as dripping) the sealant in the sealing groove. The sealant is constrained by a shape of the sealing groove and serves as a sealing element.

According to embodiments of the present disclosure, the sealing element is provided between the light filtering part F1 and the transparent cover plate BP, so as to improve the waterproof effect, which can be applied in different types of light filtering parts and different types of frame assemblys.

Figure 4:
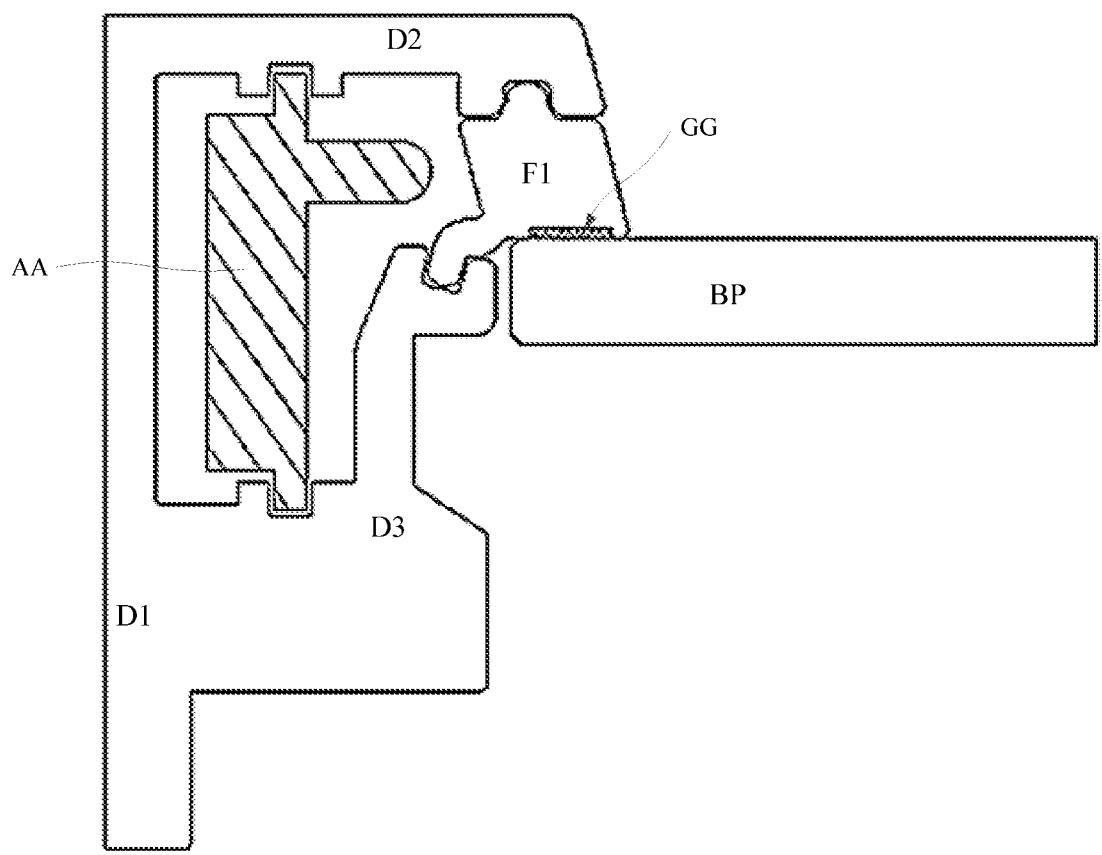
FIG. 4 is a schematic diagram of a local structure of a display device according to embodiments of the present disclosure.

For example, in embodiments shown in FIG. 4, the front frame wall can form the securing groove, and the light filtering part F1 forms the securing protrusion that matches with the securing groove. Such arrangement can also effectively improve the fit and the fix between the light filtering part F1 and the front frame wall.

Figure 5:
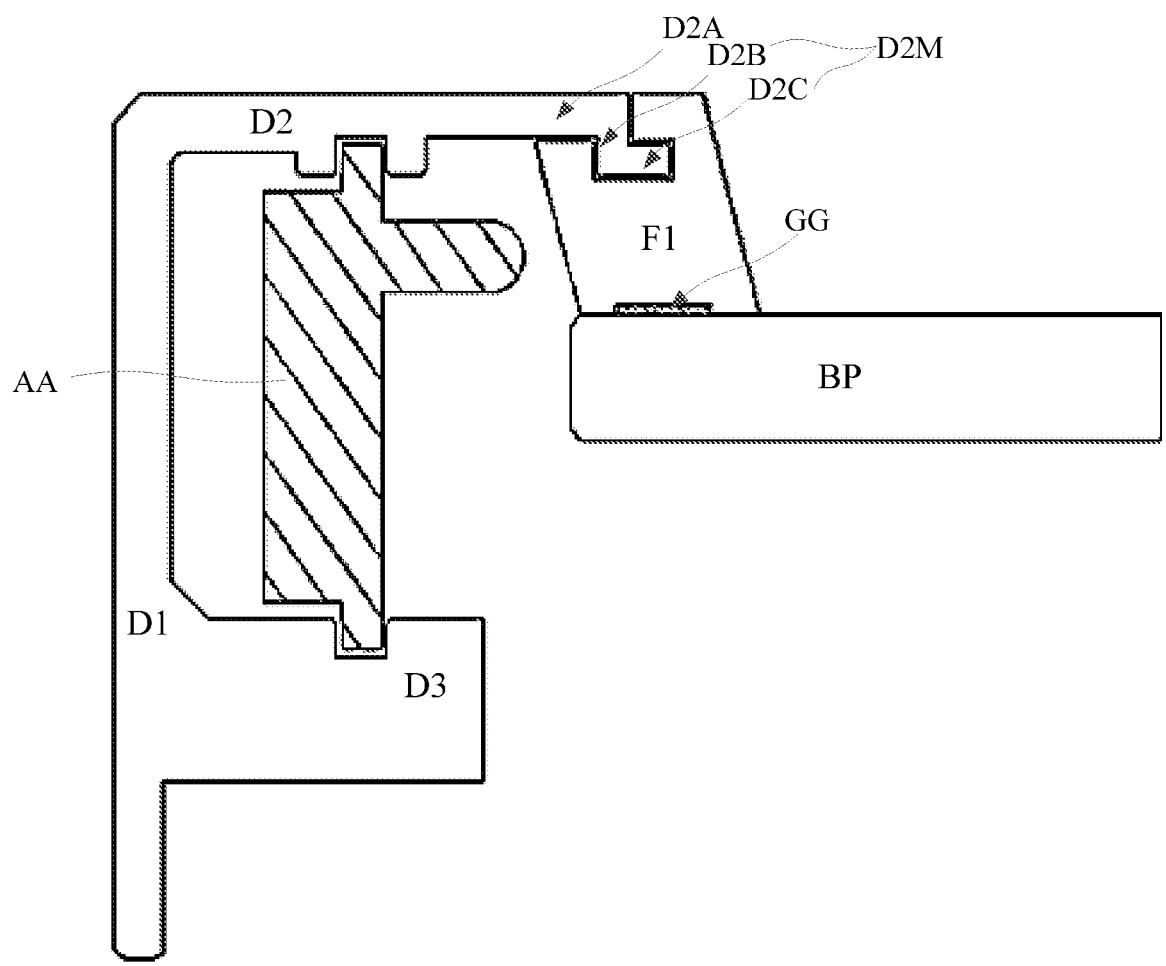
FIG. 5 is a schematic diagram of a local structure of a display device according to embodiments of the present disclosure.

For example, in embodiments shown in FIG. 5, an end of the front frame wall D2 can form a bent fastening part D2M, and the light filtering part F1 can form a fastening chamber that matches with the fastening part. The fastening part D2M can be inserted into the fastening chamber, thereby effectively improve the fit and the connection between the light filtering part F1 and the front frame wall. Furthermore, the fastening part D2M of the front frame wall D2 can include a connecting protrusion D2B extending towards a side of the transparent cover plate BP, and a positioning protrusion D2C connected to the connecting protrusion D2B and parallel to the transparent cover plate BP. The connecting protrusion D2B is perpendicular to the transparent cover plate BP, and the positioning protrusion D2C is connected to an end of the connecting protrusion D2B close to the transparent cover plate BP and extends towards a direction away from the infrared touch assembly AA. Correspondingly, the fastening chamber includes an avoidance gap, a connecting groove, and a positioning groove. A shape of the positioning groove matches with a shape of the positioning protrusion D2C to accommodate the positioning protrusion D2C. A shape of the connecting groove matches with a shape of the connecting protrusion D2B to accommodate the connecting protrusion D2B. The avoidance gap is connected with the connecting groove to accommodate a portion D2A of the front frame wall D2 close to the connecting protrusion. In this way, by providing the positioning groove and the connecting groove, the fastening part of the front frame wall D2 can be fixedly connected to the fastening chamber of the light filtering part F1, especially by inserting the positioning protrusion D2C of the front frame wall D2 into the positioning groove of the light filtering part F1. The light filtering part F1 can accommodate the end of the front frame wall D2 by providing the avoidance gap, avoiding the front frame wall D2 from excessively protruding in front of the light filtering part F1. In some embodiments, a thickness of the avoidance gap of the light filtering part F1 is the same as a thickness of a portion of the front frame wall D2 close to the fastening part, which allows the portion D2A of the front frame wall D2 close to the connecting protrusion to be fully accommodated in the avoidance gap. On the one hand, the front side surface of the front frame wall D2 can be flush with the front side surface of the light filtering part F1, and on the other hand, an inner side end of the front frame wall D2 can be completely wrapped by the light filtering part F1.

For example, in embodiments shown in FIG. 5, the light filtering part F1 can be not provided with the buffer part, and the rear frame wall can be not provided with the resisting part either. The display device can fix the transparent cover plate BP through other means to ensure that the transparent cover plate BP does not slip.

Figure 6:
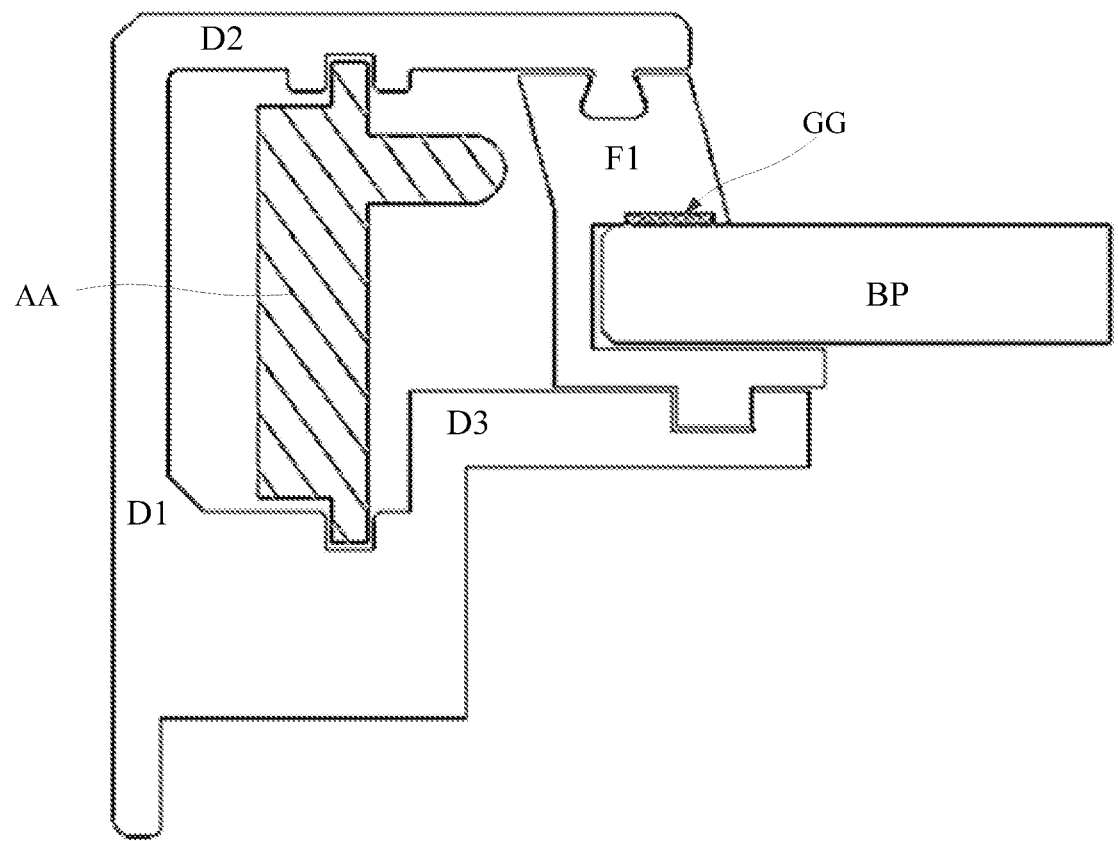
FIG. 6 is a schematic diagram of a local structure of a display device according to embodiments of the present disclosure.

For example, in embodiments shown in FIG. 6, one end of the light filtering strip close to the frame assembly can be provided with a wrapping part connected to the light filtering part F1, and the wrapping part can wrap the side surface and the rear side edge of the transparent cover plate BP. The rear frame wall can have a supporting part, and the supporting part and the rear side surface of the transparent cover plate BP are connected and buffered through the wrapping part. In some embodiments, a portion of the wrapping part located on the rear side surface of the transparent cover plate BP has a fixed protrusion, and the supporting part of the rear frame wall has a fixed groove that matches with the fixed protrusion. In this way, the wrapping part can be prevented from side slipping, thereby improving the fixing effect on the transparent cover plate BP.

Figure 7:
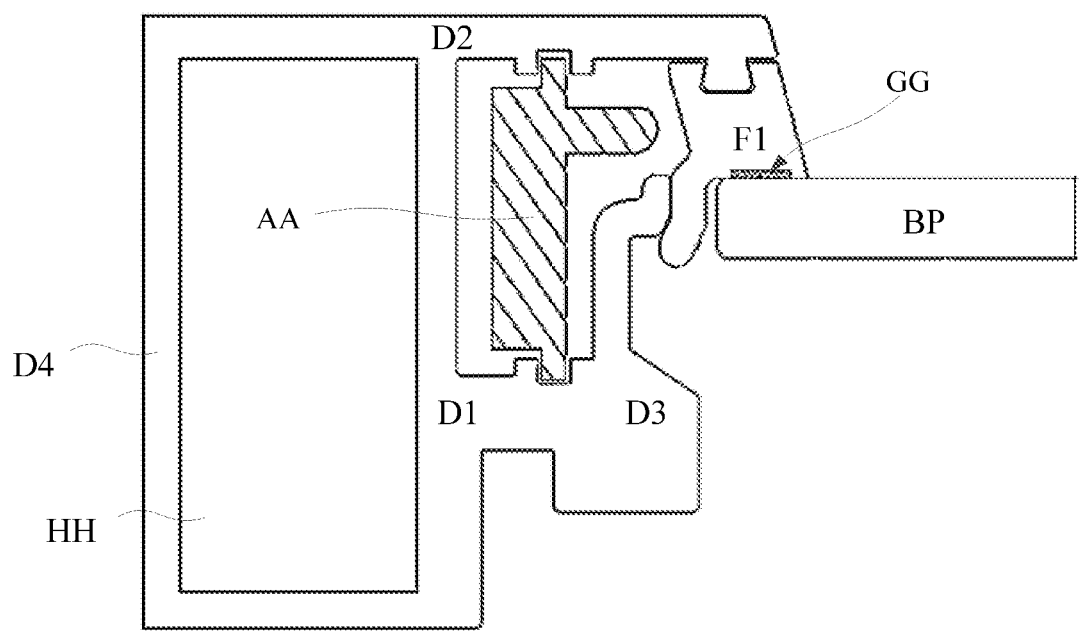
FIG. 7 is a schematic diagram of a local structure of a display device according to embodiments of the present disclosure.

For example, in embodiments shown in FIG. 7, the frame assembly can also be provided with a reinforcing part D4, the reinforcing part D4 is located on the outer side of the outer frame body D1 and has a weight reducing cavity HH between it and the outer frame body D1. In this way, the strength of the frame assembly can be improved. In some embodiments, electronics can also be arranged in the weight reducing cavity HH, such as a driving circuit for driving the display panel. In the present disclosure, a material of the transparent cover plate BP can be inorganic or organic. For example, in some embodiments of the present disclosure, the material of the transparent cover plate BP can be soda-lime glass, quartz glass, sapphire glass, and other glass materials. For example, in some embodiments of the present disclosure, the material of the transparent cover plate BP can be polymethyl methacrylate (PMMA), polyvinyl alcohol (PVA), polyvinyl phenol (PVP), polycarbonate (PC), polyethylene terephthalate (PET), polyethylene naphthalate (PEN), and other transparent organic materials.

In some embodiments, the transparent cover plate BP is a tempered glass cover plate.

In some embodiments of the present disclosure, the materials of the outer frame DD and supporting member EE can be metallic materials, such as alloy materials, so as to enhance the strength of the outer frame DD and the supporting member EE. It can be understood that the materials of the outer frame DD and the supporting member EE can be the same or different. In some embodiments, the materials of the outer frame DD and the supporting member EE are aluminum alloy.

In the present disclosure, the display panel PNL can be an OLED (Organic Light-Emitting Diode) display panel, a Micro LED (Micro Light-Emitting Diode) display panel, a QD-OLED (Quantum Dot Light-Emitting Diode) display panel, an LCD display panel (liquid crystal display panel), an EPD display panel (electrophoresis display panel) or other feasible display panels, which can display the image, and are not limited in the present disclosure. For example, in some embodiments of the present disclosure, the display panel is an LCD display panel, which includes a display module and a backlight module stacked arranged, and the backlight module is located behind the display module.

After considering the specification and practicing of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

What is claimed is:

1. A display device, comprising a transparent cover plate, a display panel, a frame assembly, and an infrared touch assembly,
    wherein the frame assembly comprises an outer frame and a light filtering strip, the light filtering strip comprises a light filtering part that presses at a front side edge of the transparent cover plate, and the outer frame comprises an outer frame body, a front frame wall, and a rear frame wall, and wherein an outer side end of the front frame wall is connected to the outer frame body, an inner side end of the front frame wall presses on a front side surface of the light filtering part, and an outer side end of the rear frame wall is connected to the outer frame body;
    wherein the infrared touch assembly is fixed between the front frame wall and the rear frame wall, and is provided with an infrared emitter or an infrared receiver; and
    wherein the display panel is fixed behind the transparent cover plate.

2. The display device according to claim 1, wherein the light filtering strip further comprises a buffer part located on a side of the transparent cover plate, and the rear frame wall comprises a resisting part that resists against an outer side of the buffer part.

3. The display device according to claim 2, wherein the buffer part comprises a bearing section and a guiding section, a width of the bearing section is not smaller than half of a thickness of the transparent cover plate, and the guiding section is connected to a rear side end of the bearing section and tilts towards the outer side of the buffer part.

4. The display device according to claim 3, wherein the bearing section resists against the resisting part on all outer side surface of the bearing section.

5. The display device according to claim 3, wherein an angle between the guiding section and a side surface of the transparent cover plate ranges between 5° and 30°.

6. The display device according to claim 3, wherein the front side edge of the transparent cover plate is provided with a chamfer, the buffer part further comprises a transfering section, and the transfering section is parallel to the chamfer at the front side edge of the transparent cover plate, and wherein a front side end of the transfering section is connected to the light filtering part, and a rear side end of the transfering section is connected to a front side end of the bearing section.

7. The display device according to claim 2, wherein a thickness of the buffer part is not smaller than 1 millimeter; and/or
    a size of the buffer part in a front-rear direction is 0.9-1.3 times a thickness of the transparent cover plate.

8. The display device according to claim 2, wherein one of the front frame wall and the light filtering part is provided with a securing protrusion and the other thereof is provided with a securing groove, and the securing protrusion and the securing groove matches with each other to connect the front frame wall to the light filtering part.

9. The display device according to claim 8, wherein the front frame wall is provided with the securing protrusion protruding towards a rear side of the front frame wall, and a thickness of a rear side end of the securing protrusion is greater than a thickness of a front side end of the securing protrusion; and
    wherein the front side surface of the light filtering part is provided with the securing groove that matches with the securing protrusion, and the securing protrusion is inserted into the securing groove.

10. The display device according to claim 8, wherein the front frame wall is provided with the securing protrusion protruding towards a rear side of the front frame wall, the front side surface of the light filtering part is provided with the securing groove that matches with the securing protrusion, and the securing protrusion is inserted into the securing groove; and
    wherein the light filtering strip further comprises a limit protrusion protruding towards an outer side of the transparent cover plate, and the resisting part resists against a rear side surface of the limit protrusion.

11. The display device according to claim 2, wherein the rear frame wall further comprises a rear frame wall body and a connection wall, an outer side end of the rear frame wall body is connected to the outer frame body, and the connection wall is connected to the rear frame wall body and extends to connect with the resisting part.

12. The display device according to claim 11, wherein the rear frame wall body is provided on a rear side of the transparent cover plate.

13. The display device according to claim 11, wherein the connection wall comprises a first connection wall and a second connection wall, a rear side end of the first connection wall is connected to a front side surface of the rear frame wall body, a front side end of the first connection wall is connected to an outer side end of the second connection wall, and an inner side end of the second connection wall is connected to the resisting part.

14. The display device according to claim 13, wherein an avoidance groove is formed between the first connection wall, the second connection wall, and the rear frame wall body, the buffer part comprises a bearing section and a guiding section, the guiding section is connected to a rear side end of the bearing section and extends towards a direction of the avoidance groove.

15. The display device according to claim 1, wherein the frame assembly further comprises a supporting member, and the supporting member is connected to the outer frame and bonded to a rear side edge of the transparent cover plate through an elastic material.

16. The display device according to claim 15, wherein the supporting member comprises a first supporting vertical wall, a supporting transverse wall, and a second supporting vertical wall, the first supporting vertical wall is connected to a front side end of the supporting transverse wall and extends towards an inner side of the transparent cover plate, the first supporting vertical wall and the rear side edge of the transparent cover plate are bonded through the elastic material, the second supporting vertical wall is connected to a rear side end of the supporting transverse wall and extends towards an outer side of the transparent cover plate, and the second supporting vertical wall is connected to the outer frame.

17. The display device according to claim 15, wherein the elastic material is double-sided adhesive, and a width of an adhesive surface between the double-sided adhesive and the transparent cover plate is 1.1-2.0 times a width of a contact surface between the light filtering part and the transparent cover plate; and/or
    the elastic material is a foam tape, and a compression rate of the foam tape is 40%-60%.

18. The display device according to claim 1, wherein a sealing groove is provided on a rear side surface of the light filtering part, a sealing element is provided inside the sealing groove, and an interference fit is used between the sealing element and the transparent cover plate; and/or
    a sealing groove is provided on a rear side surface of the light filtering part, the sealing groove is filled with sealant, and the transparent cover plate and the filtering part are sealed and connected through the sealant.

19. The display device according to claim 18, wherein a width of the sealing groove is not smaller than 0.5 times a width of a contact surface between the light filtering part and the transparent cover plate; and/or
    a depth of the sealing groove is not smaller than 0.2 millimeters.

20. The display device according to claim 18, wherein the sealing element satisfies at least one of:
    a compression amount of the sealing element is between 40% and 60%;
    a friction coefficient between the sealing element and the transparent cover plate ranges from 1.0 to 3.5;
    a surface roughness of the sealing element close to the transparent cover plate is within a range of 4-12 microns;
    the sealing element is hydrophobic; or the sealing element is a silicone strip.

\* \* \* \* \*